UNITED STATES PATENT OFFICE.

THEODORE J. BREWSTER, OF PERTH AMBOY, NEW JERSEY.

PROCESS OF MAKING NITROPHENOLIC COMPOUNDS.

1,380,186. Specification of Letters Patent. Patented May 31, 1921.

No Drawing. Application filed October 2, 1918. Serial No. 256,524.

*To all whom it may concern:*

Be it known that I, THEODORE J. BREWSTER, a citizen of the United States, and resident of Perth Amboy, in the county of Middlesex and State of New Jersey, have invented certain new and useful Improvements in Processes of Making Nitrophenolic Compounds, of which the following is a specification.

This invention is a process of making nitro-phenolic compounds and has for its main object the more economical use of the material employed by preventing to a great extent the destructive oxidation or breaking down of the benzene ring radical and the loss by distillation or decomposition of the nitric acid. By preventing such loss, I am able to obtain a much larger percentage yield of the picric acid or other nitro-phenolic compounds in respect to the benzol or phenol and the nitric acid or nitric acid yielding reagents.

In the ordinary methods heretofore employed benzol has been directly converted into picric acid by nitric acid in the presence of such a catalyst as a mercury salt and phenol has been converted to a phenol sulfonic acid and the latter thereafter directly converted to picric acid by the action of nitric acid. It is well known that in both of these processes there is quite a large loss of both the benzol or phenol and the nitric acid.

I have discovered that a great saving of materials can be effected by preventing the direct conversion into picric acid and producing first a lower nitro-compound and then further nitrating this to the final desired product; and I have further discovered that this can be accomplished practically and successfully by carrying out the first or preliminary nitration under controlled conditions particularly as to the amount of nitric acid present and as to temperature. I first nitrate an appropriate benzene ring radical such as benzol or phenol and at the same time keep the temperature down by artificial cooling and prevent it from rising to such a temperature as naturally results from the reaction taking place. After a complete or fairly complete conversion into a lower nitro-compound, one can add more nitric acid and raise the temperature or permit it to rise and accomplish the further nitration to the higher nitro-phenolic compound desired. By effecting the preliminary introduction of a lower number of nitro groups particularly the first nitro group, at a low temperature, the ring is apparently protected thereby and the higher temperature necessary for the introduction of further nitro groups does not break it up at least to nowhere near as large an extent.

In my prior application, Serial No. 202,930, filed November 20, 1917, I have disclosed one embodiment of my present invention. In making picric acid from benzol in accordance with the process there disclosed, a higher yield of products and a less consumption of nitrating reagents results from the elimination in the initial steps of nitration of certain conditions that promote decomposition of the compounds taking part in the reaction. The temperature at which the initial steps of nitration are conducted influences to a large degree the yield of products and the consumption of nitrating reagents. I have there disclosed the production of nitro-phenolic compounds by simultaneous oxidation and nitration of benzol by nitric acid in the presence of mercury or a mercury salt and accomplish this by maintaining a temperature of reaction which produces nitro-phenolic compounds of a degree of nitration not higher than di-nitro-phenol which temperature under the conditions of nitration there set forth is approximately 50° C.

My present invention, broadly considered, involves the specific process there disclosed as well as utilization of the same principle in the production of picric acid from phenol sulfonic acid in which later embodiment I maintain a low temperature of 50 to 70° C. through the introduction of the first nitro group as contrasted with the usual procedure followed in this art which consists in allowing the temperature of reaction of the phenol sulfonic acid and the nitrating reagent to immediately rise to a point at which picric acid is rapidly formed, namely 100° C. or above. The same principle of maintaining low temperature during the introduction of the first nitro-group or groups and the later raising of the temperature and the addition of acid for the introduction of the further nitro groups in order to secure a higher yield of product is also applicable to the production of nitro-phenolic compounds by acting upon phenol with nitric acid or a nitric acid yielding mixture, in which case I maintain a low reaction temperature preferably of about 30° C. or below throughout the introduction of the first or first two nitro groups.

The following example illustrates the application of my process to the catalytic method for the simultaneous oxidation and nitration of benzol into picric acid.

Gradually add one part of benzol to twelve parts of acid mixture containing fifty (50%) per cent. nitric acid, three (3%) per cent. mercury in the form of mercuric nitrate, the remaining forty-seven (47%) per cent. being water. The temperature is maintained at 50° C. with agitation throughout the period in which benzol is converted into a low nitrophenolic compound, although the temperature in commercial practice may be permitted to rise to 60° C. with the production of a small amount of picric acid if that compound be the final product desired. This low temperature treatment may require twelve hours. The low temperature may be secured by any suitable form of artificial cooling, such for instance, as cooling coils and the agitation should be sufficiently thorough and rapid to prevent any local heating action. The mixture may then be heated to 100° C. by any suitable means, such for instance, as steam coils, for approximately two hours. During the entire treatment the acid strength should be maintained at approximately fifty (50%) per cent. This is accomplished through the addition of nitric acid of high strength as the reaction proceeds. I have found that by means of the foregoing method I am able to obtain a yield of 1.45 of picric acid in respect to the benzol employed while if the temperature be permitted to rise to from 68 to 74° C. during the period of benzol conversion, all of the conditions being similar, a yield of only about 1.1 will be obtained. The second or higher nitration may be carried out in the same nitrator as the preliminary nitration or if desired it may be withdrawn to separate apparatus for the further nitration, using a nitrating mixture or nitrating reagents of different composition than that mentioned above. In this case, the presence of mercury is not required and the nitrating mixture may preferably consist of nitric and sulphuric acids, in which case a yield of picric acid is obtained greatly in excess of that obtained through the use of fifty (50%) per cent. nitric acid containing mercury. Owing to the presence of impurities in the product of the preliminary reaction, it is preferable to thoroughly purify before the final nitration, although this may not be essential.

As a further example of my improved process, I may operate as follows: Take one part of phenol and treat it with two parts of 66° Baumé sulfuric acid, maintaining a temperature of 90 to 95° C. for approximately eight hours. Then cool to approximately 50° C. and dilute with two parts water, carefully cooling and agitating meanwhile so that a temperature of 50° C. is not exceeded. The resulting phenol sulfonic acid in solution is conducted to a suitable container fitted with means whereby proper cooling and agitation may be obtained, and I there gradually add a total of one and one tenth (1.1) parts of 42° Baumé nitric acid which is slightly in excess of the nitric acid required to introduce one nitro group in the phenol sulfonic acid. This reaction takes place when carefully performed with agitation and cooling throughout so that the reaction temperature is kept at all times close to 50° C. and in no case allowed to go above 70° C. The copious evolution of nitrous gases which is encountered when the temperature is allowed to rise above those stated during the introduction of the first nitro group is very largely avoided. The resulting mixture is allowed to remain in the reaction vessel for about eight hours and is kept at 50 to 70° C. and any heat developed meanwhile is absorbed by the coils or other cooling device. This resulting mixture is then nitrated in one of the manners well known to the art which consists in treating it, accomplished by vigorous agitation with nitric acid with approximately 42° Baumé or with a nitrating mixture containing a proper proportion of nitrating ingredients and water, and allowing the temperature to rise during the operation to 114° C. When the nitration is complete, the product is allowed to cool and crystallize and is separated from the spent liquor by filtration or other means well known to the art. The yield of product resulting from the use of my improved process is from 2 to 2.2 parts of picric acid for each part of phenol acted upon. Whereas when diluted phenol sulfuric acid is directly subjected to the action of nitrating mixtures at temperatures exceeding those above given and which in practice are about 100 to 115° C. in common practice, the yield of picric acid is about from 1.7 to 1.87 per part of phenol acted upon.

From the foregoing facts it is apparent that the use of low temperature throughout the initial steps of the nitration promotes a true nitrating reaction as distinct from an oxidizing reaction. This is further borne out by the fact that nitrous fumes which indicate decomposition of reacting compound are freely evolved when high temperatures are employed in the initial steps whereas the evolution is decreased to a marked degree when low temperatures are employed. I find that once having introduced the initial nitro group, in accordance with the above procedure, whereby relatively little decomposition occurs, I can then impose conditions of nitration on the resulting products whereby conversion into the desired higher nitrated products can be effected without that loss of products and consumption of nitrating reagents which result when these conditions are imposed upon the original substance.

The nitrating mixture which I may employ may vary under different conditions and may be nitric acid, a mixture of nitric and sulfuric acids, a mixture of sulfuric acid and a nitrate such as sodium nitrate or oxid of nitrogen fumes or gas in the presence of water. In other words, I may, under proper conditions, use any nitric acid yielding compound or mixture.

My process contemplates the use of an appropriate benzene ring compound which upon treatment in accordance with my process will result in a product having both the hydroxyl (OH) and nitro ($NO_2$) groups therein. Such appropriate ring compounds are preferably benzol or phenol although other bases might be employed. The relative quantities of the ingredients, and the manner in which they are brought together as for instance either a little of each at a time or one gradually added to the other or all mixed in bulk may be varied as operating conditions make advisable, but it is very essential that the temperature control be maintained approximately as above indicated.

Having thus described my invention what I claim as new and desire to secure by Letters Patent is:

1. The process of making picric acid including the steps of sulfonating phenol, cooling to approximately 50° C., diluting, nitrating to the mono-nitro stage by adding nitric acid slightly in excess of that required for introduction of one nitro group while maintaining the temperature below 70° C. and thereafter nitrating to tri-nitro stage by adding further nitric acid and permitting the temperature to rise above 70° C.

2. The process of making picric acid which includes the steps of nitrating phenol sulfonic acid to the mono-nitro stage by adding nitric acid slightly in excess of that required for the introduction of one nitro group while maintaining the temperature at approximately 50° C. and thereafter nitrating to the tri-nitro stage by adding further nitric acid while allowing the temperature to rise without cooling.

3. The process of making picric acid which includes the steps of nitrating phenol sulfonic acid to the mono-nitro stage by adding nitric acid slightly in excess of that required for the introduction of one nitro group while maintaining the temperature at approximately 50° C. and thereafter nitrating to the tri-nitro stage by adding further nitric acid while allowing the temperature to rise to above 100° C.

4. The process of making picric acid which includes the steps of nitrating an appropriate benzene ring compound to the mono-nitro stage with a limited quantity of nitric acid while maintaining the temperature below 60° C. by artificial cooling, and thereafter nitrating to the tri-nitro stage by addition of nitric acid and heating to approximately 100° C.

Signed at New York, in the county of New York and State of New York this 1st day of October, A. D. 1918.

THEODORE J. BREWSTER.